L. KERN.
ARTIFICIAL BUILDING MATERIAL AND METHOD FOR PRODUCING THE SAME.
APPLICATION FILED JUNE 22, 1914.
1,206,545.
Patented Nov. 28, 1916.
2 SHEETS—SHEET 1.
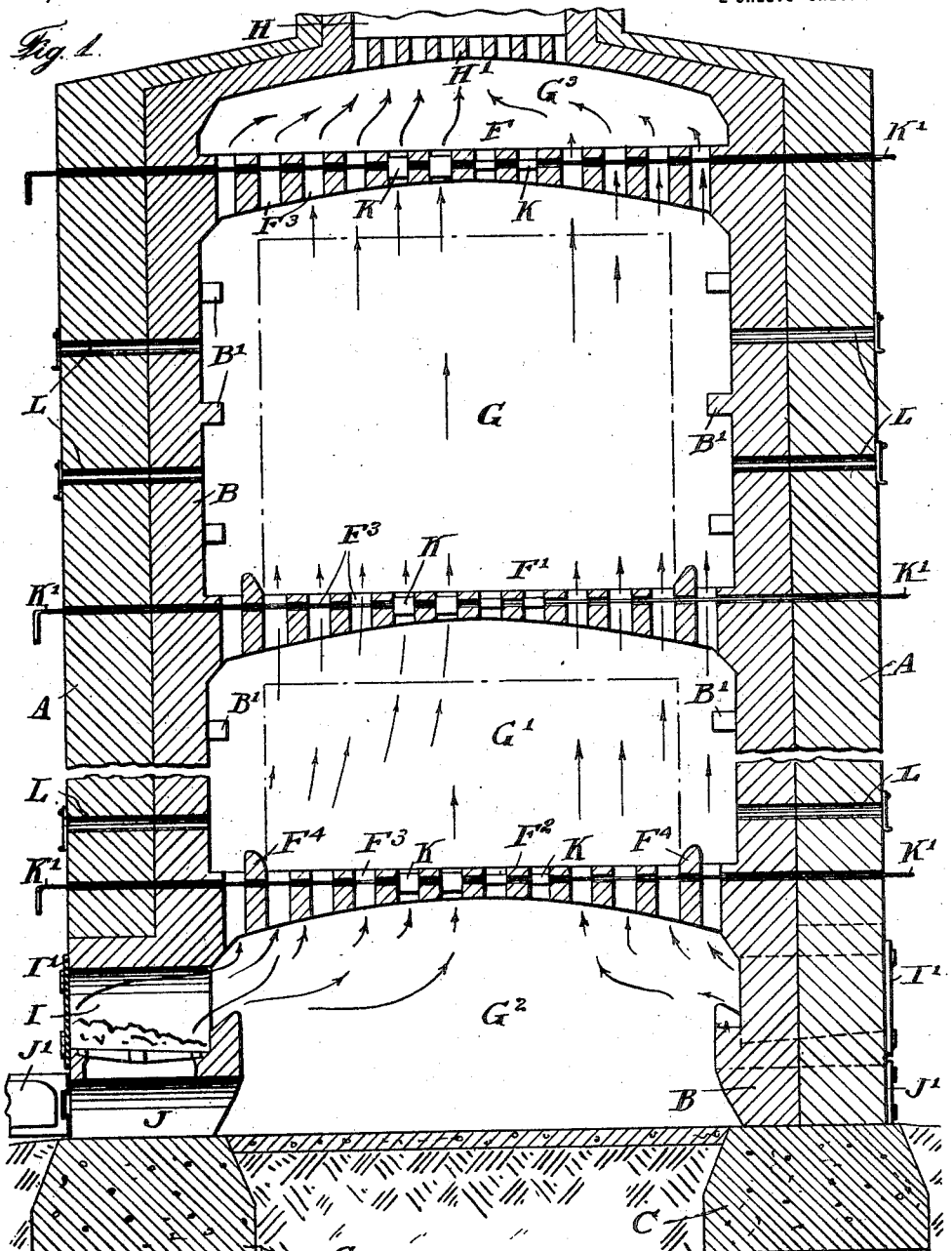

L. KERN.
ARTIFICIAL BUILDING MATERIAL AND METHOD FOR PRODUCING THE SAME.
APPLICATION FILED JUNE 22, 1914.
1,206,545.
Patented Nov. 28, 1916.
2 SHEETS—SHEET 2.
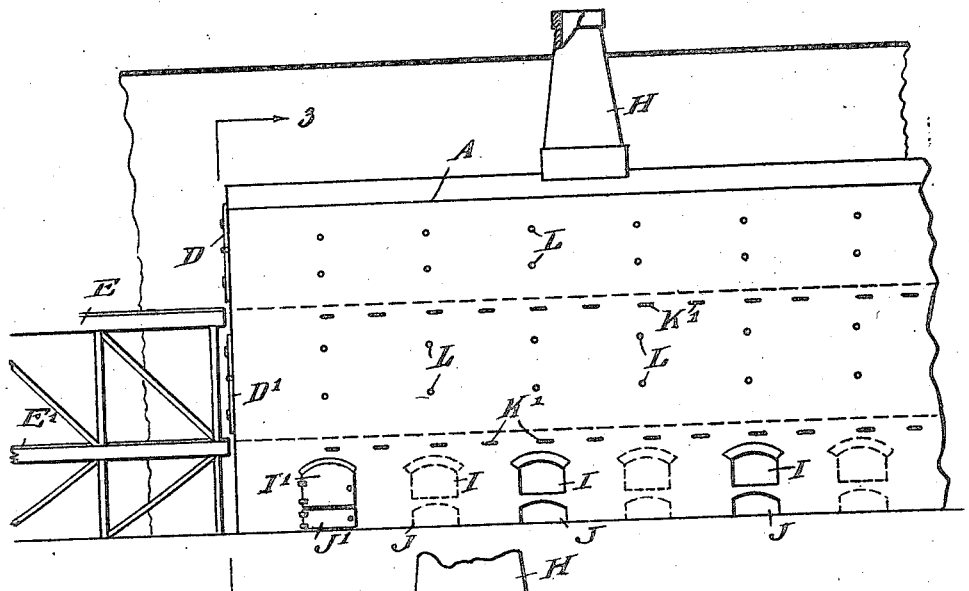
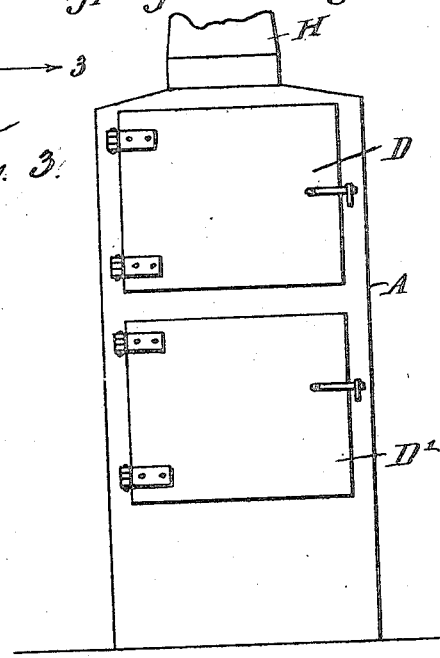
WITNESSES
Otto Fricke.
INVENTOR
Ludwig Kern
BY
ATTORNEYS

UNITED STATES PATENT OFFICE.

LUDWIG KERN, OF HAMBURG, GERMANY.

ARTIFICIAL BUILDING MATERIAL AND METHOD FOR PRODUCING THE SAME.

1,206,545.  Specification of Letters Patent.  Patented Nov. 28, 1916.

Application filed June 22, 1914. Serial No. 846,490.

*To all whom it may concern:*

Be it known that I, LUDWIG KERN, a subject of the German Emperor, and a resident of Hamburg, Germany, have invented a new and Improved Artificial Building Material and Method for Producing the Same, of which the following is a full, clear, and exact description.

The object of the invention is to provide a new and improved artificial brick or like building material and method for producing the same, the brick having the desired strength of compression, is sound and fireproof, exceedingly light and porous and capable of being sawed, drilled and nailed in place, thus rendering the brick exceedingly serviceable for use in partition walls and other interior structures.

In order to accomplish the desired result, use is made of infusorial earth and a clay melting at a low degree of heat, the infusorial earth and clay being mixed together while in wet condition in about the proportions of two-thirds of infusorial earth to one-third of the clay, the ingredients after being mixed and pressed into form being burned in a short time at a comparatively low temperature.

The method consists essentially in intimately mixing infusorial earth and clay of a low melting point while both are in a wet condition, then molding and pressing the mass to form a brick, then subjecting the brick to the action of a current of air, then subjecting the brick to a heat of approximately 650° to 950° centigrade, for a few hours, and finally subjecting the brick to a current of air for quickly cooling it. Brick thus cooled very rapidly is able to resist disruption to a high degree, and there is the added advantage that the entire process of producing the brick in condition to be handled requires but as many hours as the usual or old process requires days.

In order to carry out this method use is made of a kiln or oven, such as shown in the accompanying drawings, in which similar characters of reference indicate corresponding parts in all the views.

Figure 1 is a cross section of the kiln; Fig. 2 is a reduced side elevation of the same with the housing in section and some of the side doors of the furnace and air inlets omitted; and Fig. 3 is a front end elevation of the kiln.

In the present invention a brick is produced which has four essential properties, namely, strength of compression, soundproof and fire proof qualities, porosity, and low specific gravity. Heretofore bricks have been made of a mass consisting of infusorial earth and ordinary clay of a high melting point and burned in an ordinary brick kiln. The bricks thus produced lack two of the four properties above mentioned, namely, low specific gravity and porosity. Now in order to render such brick porous, an easily burnable substance, such as carbon, coke, comminuted wood or cork, was added to the mixture and burned during the process of hardening the brick, thus leaving pores or openings in the brick, but such a brick does not possess the desired strength of compression. It is also desirable that a brick can be easily transported the same as the ordinary bricks, that is, without requiring special packings. The brick presently described in detail has the above desired properties and can be readily shipped and used.

In detail, I proceed as follows: A clay having a low melting point, such as used for the manufacture of earthenware, flower pots and similar porous articles, and infusorial earth are mixed while wet in the proportions of two-thirds of infusorial earth to one-third of clay, and the resultant mass is then formed and pressed by suitable machinery into brick form or other form. The bricks are next set in staggered relation in a kiln or oven and subjected therein to a strong current of air. The bricks are next subjected for a few hours to a heat of about 650° to 950° centigrade, to burn or harden the bricks, and then the bricks are subjected while in the kiln to another current of air to quickly cool the bricks. The bricks are then removed from the kiln. The brick produced in the manner described has the desired strength of compression, is fireproof and sound-proof, very porous and of low specific gravity.

It will be noticed that by first driving out a portion of the moisture from the unburned bricks, the diatoms (silicic acid), which form the major portion of the infusorial earth or Kieselguhr, are deprived of a carrier and hence only a very small amount of the diatoms is absorbed by the clay during the subsequent burning. The remaining major portion of the diatoms remains unabsorbed and in drying forms a cemented diatomic mass intermediate the clay particles. It is well known that in slowly burning a mixture of infusorial earth and clay of a high melting point (950° to 1600° centigrade) the diatoms are completely absorbed by the clay and hence the brick is not porous and is as heavy as ordinary brick. It is expressly understood that owing to the low melting point of the clay the latter melts prior to being capable of absorbing all or the major portion of the diatoms and hence only a small portion of the diatoms are absorbed by the clay while the remaining portion of the diatoms forms a hard cementitious mass which binds the clay. It is further understood that clay of a low melting point possesses a larger percentage of fluxing substances than clay having a high melting point of 950° to 1600° centigrade, and hence the burning of the brick can be accomplished in from three to six hours instead of so many days, as is required for burning ordinary ceramic ware. In carrying off some of the moisture by the strong current of air, the pores are opened and allow a ready escape of the steam and gases which form during the subsequent burning and hence the bricks are not liable to crack, burst or break during the burning operation by the penned steam and gases.

The kiln or oven consists of a suitable housing A having an interior lining B of fire clay or other fireproof material, and the housing is built on a suitable foundation C. The front end of the housing A is provided with suitable doors D, D' in front of which are arranged platforms E, E' for carrying the bricks to be burned into the interior of the housing A and removing the burned bricks therefrom. The housing A is provided with horizontally disposed perforate partitions F, F', and F² dividing the interior of the housing into two compartments G and G' for receiving the bricks, and into a bottom combustion chamber G² and a top chamber G³, from which extends a chimney H, the bottom H' of which is likewise perforated, as indicated in Fig. 1. The bricks are set on the partitions F' and F², as indicated in Fig. 1, and with the sides spaced from the sides of the lining B to permit a proper circulation of air and heat, as hereinafter more fully explained.

The sides of the housing A are provided with furnaces I for burning coke or other fuel and opening into the combustion chamber G², the furnaces I on the two sides of the kiln being arranged in staggered relation to each other, and each furnace is provided with a suitable door I'. The ash pit J for each furnace I opens at its inner end into the combustion chamber G² for admitting air into the said combustion chamber prior to starting up the furnaces I, so as to subject the bricks in the compartments G and G' to the action of a strong current of air. The outer ends of the ash pits J are provided with suitable doors J'.

In order to prevent the air and the heat emanating from the burning fuel in the furnaces I from rising centrally through the compartments G, G', G³ to the stack H, it is desirable to close the middle perforations F³ of the partitions F, F' and F² during the beginning of the firing of the furnaces I, and for this purpose the said middle perforations F³ are preferably closed by suitable dampers K mounted on rods K' extending to the outside of the kiln and adapted to be turned by the operator to open and close the said dampers and consequently the middle perforations F³. Thus when the dampers are closed the air and the heat from the combustion chamber G² passes upwardly through the open side perforations F³ of the partition F² and through the bricks resting on the said partition. The air or heat next passes through the side perforations F³ of the partition F' and rises through the stack of bricks set on the partition F' and the air and heat finally pass through the side perforations F³ in the upper partition F to finally reach the top compartment G³ from which the air and heat pass next into the chimney H and out of the same.

The sides of the housing A are further provided with suitable peep holes L leading into the compartments G and G' to permit of observing the burning of the bricks in the said compartments.

The operation is as follows: The bricks are set in staggered relation into the compartments G and G', as previously explained, and then the doors D, D' are closed and the doors J' are opened so that a current of air can circulate through the compartments G², G', G and G³ and through the bricks set in the compartments G and G'. The current of air removes some of the moisture contained in the bricks and then the furnaces I are started so as to cause the resultant products of combustion to circulate through the compartments G², G' G and G³ and through the bricks to burn the same. Owing to the use of clay of a low melting point it requires but a comparatively short time, say three to six hours, to complete the burning of the bricks, and then the fires in the furnaces are drawn and the doors J' are again fully opened to allow air to circulate through the bricks to quickly cool the same. It is understood that at the beginning of the operation the dampers K are preferably closed to prevent the bricks in the centers of the stacks from being subjected to an injurious concentrated high heat, but after the bricks have been somewhat burned the dampers K are opened to insure a uniform burning of all the bricks in the stacks.

In order to enable the workmen to properly form the stacks of bricks in the compartments G and G' the partitions F' and F² are provided near the sides with raised ledges F⁴ to form guides for forming the stacks, as will be readily understood by reference to Fig. 1.

The inner faces of the lining B are provided with lugs B' to prevent obstruction of the passages between the sides of the stacks and the inner faces of the lining in case some of the bricks in the stacks should become displaced and fall against the said faces of the lining.

The herein described kiln is described and claimed in my copending application No. 70,217, filed January 4, 1916, which is a division of this application.

Having thus described my invention, I claim as new and desire to secure by Letters Patent:

1. As an article of manufacture, a brick for building purposes formed of a mixture of infusorial earth and a clay having a low melting point, in about the proportions specified, the mixture melting at a temperature of about 650° to 950° centigrade, whereby a brick which is porous, fireproof, and of low specific gravity is produced.

2. The herein described method for producing a brick which is porous, fireproof and of low specific gravity, consisting in mixing infusorial earth and a clay having a low melting point while both ingredients are wet, then molding and pressing the resultant mass into the desired shape, then subjecting the brick to the action of a current of air, then burning the brick, and then quickly cooling the brick.

In testimony whereof I have signed my name to this specification in the presence of two subscribing witnesses.

LUDWIG KERN.

Witnesses:
GEO. G. HOSTER,
PHILIP D. ROLLHAUS.